United States Patent
Sada et al.

(10) Patent No.: US 7,311,998 B1
(45) Date of Patent: Dec. 25, 2007

(54) LITHIUM POLYMER BATTERY WITH A CROSSLINKED ELECTROLYTE

(75) Inventors: Tsutomu Sada, Otsu (JP); Kazunari Takeda, Tsurugashima (JP); Naoto Nishimura, Kashihara (JP); Takehito Mitate, Yamatotakada (JP); Naoto Torata, Kashihara (JP); Kazuo Yamada, Kitakatsuargi-gun (JP); Motoaki Nishijima, Gose (JP)

(73) Assignee: Sharp Kabushiki Kaisha, Osaka (JP)

( * ) Notice: Subject to any disclaimer, the term of this patent is extended or adjusted under 35 U.S.C. 154(b) by 180 days.

(21) Appl. No.: 10/130,961

(22) PCT Filed: Nov. 17, 2000

(86) PCT No.: PCT/JP00/08142

§ 371 (c)(1),
(2), (4) Date: Feb. 27, 2003

(87) PCT Pub. No.: WO01/39315

PCT Pub. Date: May 31, 2001

(30) Foreign Application Priority Data

Nov. 19, 1999 (JP) ............................. 11-330245
Oct. 24, 2000 (JP) ............................. 2000-324111

(51) Int. Cl.
*H01M 4/36* (2006.01)
*H01M 10/08* (2006.01)

(52) U.S. Cl. .................... 429/231.8; 429/303; 429/317

(58) Field of Classification Search ............... 429/188, 429/189, 306, 231.8, 317
See application file for complete search history.

(56) References Cited

U.S. PATENT DOCUMENTS

| 4,303,748 A | 12/1981 | Armand et al. |
| 4,547,440 A | 10/1985 | Hooper et al. |
| 4,589,197 A | 5/1986 | North |
| 5,153,082 A | 10/1992 | Ogino et al. |
| 5,275,750 A | 1/1994 | Sato et al. |
| 5,344,726 A * | 9/1994 | Tanaka et al. ............... 429/209 |
| 5,527,639 A * | 6/1996 | Noda et al. .................. 429/311 |
| 5,691,047 A * | 11/1997 | Kurauchi et al. ......... 428/315.7 |
| 6,106,976 A | 8/2000 | Ozaki et al. |
| 6,403,259 B1 | 6/2002 | Kitagawa et al. |

(Continued)

FOREIGN PATENT DOCUMENTS

EP 0 520 667 12/1992

(Continued)

OTHER PUBLICATIONS

Japanese Unexamined Patent Publications Nos. HEI 4(1992)-115457. English abstract.

(Continued)

*Primary Examiner*—Mark Ruthkosky
(74) *Attorney, Agent, or Firm*—Morrison & Foerster LLP

(57) ABSTRACT

A polymer battery which comprises a negative electrode comprising a carbon material as an active material, an electrolyte layer and a positive electrode comprising a chalcogenide containing lithium as an active material, characterized in that the electrolyte layer comprises an ion-conducting compound and a polymer fiber, and the carbon material comprises the graphite particles having amorphous carbon adhered on the surface thereof. The polymer battery is capable of preventing the decomposition of the ion-conductive material by graphite particles.

22 Claims, 5 Drawing Sheets

U.S. PATENT DOCUMENTS 6,420,070 B1 * 7/2002 Kasamatsu et al. ...... 429/231.8

FOREIGN PATENT DOCUMENTS

| EP | 0 923 147 A2 | 6/1999 |
|---|---|---|
| JP | 5-335005 | 12/1993 |
| JP | 10-208544 | 8/1998 |
| JP | 10-214615 | 8/1998 |
| JP | 10-284080 | 10/1998 |
| JP | 10-302838 | 11/1998 |
| JP | 11-86911 | 3/1999 |
| JP | 11-238503 | 8/1999 |
| WO | WO 99/50923 | 10/1999 |

OTHER PUBLICATIONS

Japanese Unexamined Patent Publications Nos. HEI 4(1992)-115458. English abstract.

Japanese Unexamined Patent Publications Nos. HEI 4(1992)-237971. English abstract.

Japanese Unexamined Patent Publications Nos. HEI 4(1992)-368778. English abstract.

Japanese Unexamined Patent Publications Nos. HEI 5(1993)-114421. English abstract.

Japanese Unexamined Patent Publications Nos. HEI 5(1993)-28996. English abstract.

Aurbach, D. and Ein-Eli, Y. (1995). "The Study of Li-Graphite Intercalation Processes in Several Electrolyte Systems Using In Situ X-Ray Diffraction," *J. Electrochem. Soc.* 142(6):1746-1752.

Fong, R. et al. (1990). "Studies of Lithium Intercalation into Carbons Using Nonaqueous Electrochemical Cells," *J. Electrochem. Soc.* 137(7):2009-2013.

Supplementary European Search Report mailed on Oct. 30, 2006 for European Patent Application No. 00976340.0, 3 pages.

* cited by examiner

LITHIUM POLYMER BATTERY WITH A CROSSLINKED ELECTROLYTE

TECHNICAL FIELD

The present invention relates to a polymer battery, more particularly a polymer battery using an ion-conductive compound which acts reversibly at ambient temperature. Especially, the polymer battery uses the ion-conductive compound and a negative electrode containing, as an active material, a carbon material formed of graphite particles having amorphous carbon attached to the surface thereof.

BACKGROUND ART

As electrolytes for currently commercially available non-aqueous electrolyte batteries such as lithium primary batteries, lithium secondary batteries and the like, organic electrolytes formed of electrolytic salts dissolved in organic solvents are commonly used. However, the organic electrolytes are liable to leak out of components, generate the elution of electrode materials and volatilize. Therefore, there have been a problem in long-term reliability and a problem of scattering electrolytes during a sealing process.

Recently, instead of using metallic lithium or its alloy for negative electrodes, have been developed carbon materials utilizing absorption-desorption of lithium ions and matrix materials such as electroconductive polymers. Thereby, it has become possible in principle to avoid generation of dendrite, which takes place with the case where metallic lithium or its alloy is used. Consequently, the incidence of short circuit within batteries has dropped sharply. The carbon materials, especially, are known to have a lithium absorption-desorption potential close to a lithium deposition-dissolution potential. Among the carbon materials, graphite has a large capacity per unit weight and unit volume since it can take lithium atoms within its crystal lattice in a proportion of one lithium atom to six carbon atoms theoretically. Furthermore, graphite provides a flat lithium intercalation-deintercalation potential and is chemically stable. Graphite can contribute greatly to the cycle stability of batteries.

For example, J. Electronchm. Soc., Vol. 137, 2009 (1990), Japanese Unexamined Patent Publications Nos. HEI 4 (1992)-115457, HEI 4 (1992)-115458 and HEI 4 (1992)-237971 disclose batteries using graphite type carbon materials as negative electrode active materials, and Japanese Unexamined Patent Publications Nos. HEI 4 (1992)-368778, HEI 5 (1993)-28996 and HEI 5 (1993)-114421 disclose batteries using surface-treated graphite type carbon materials as negative electrode active materials.

As described above, the graphite type carbon materials can provide a discharge capacity almost equal to a theoretical capacity in organic electrolytes formed mainly of ethylene carbonate (EC). Since the charge-discharge potential thereof is slightly higher than the lithium dissolution-deposition potential and is extremely flat, it is possible to realize high-capacity secondary batteries with flat battery voltage by producing the batteries using graphite type carbon materials as negative electrode active materials.

Thus the capacity of batteries can be raised with the graphite type carbon materials, but there still remains a problem in that the graphite type carbon materials cause decomposition of organic electrolytes due to their high crystallinity. For example, propylene carbonate (PC), which is a solvent for organic electrolytes, is widely used as a solvent for electrolytes of lithium batteries since it has a large potential window, a low coagulation point (−70° C.) and a high chemical stability.

However, it is reported in J. Electrochm. Soc., Vol. 142, 1746 (1995) that, in the case where a graphite type carbon material is used as a negative electrode active material, PC decomposes significantly and the electrode formed of the graphite material cannot be charged or discharged if only 10% of PC is present in the electrolyte.

In recent years, reports have been made about organic electrolytes of EC mixed with various low-viscosity solvents for improving ion conductivity at low temperatures. However, there remain problems in volatility and leakage of such organic electrolytes.

For the purpose of improving the leakage-proof property, safety and long-term storability, ion-conductive polymers having a high ion conductivity have been reported, and are extensively studied as one means for solving the above-mentioned problems. As one type of ion-conductive polymers presently under study, homopolymers and copolymers composed of ethylene oxide as a fundamental unit, which are in the form of straight-chain polymers, crosslinked network polymers or comb-form polymers have been proposed and are almost put in practical use. Various batteries using the above-mentioned ion-conductive polymers are described in patent publications and others, which are typified, for example, by U.S. Pat. No. 4,303,784 (1981) to Armand et. al., U.S. Pat. No. 4,589,197 (1986) to North and U.S. Pat. No. 4,547,440 (1985) to Hooper et. al. These disclosures are characterized by using ion-conductive polymers wherein electrolytic salts are dissolved in polymeric materials having polyether structure. These proposed ion-conductive polymers are under research and development as electrolytes for large-size lithium batteries to be power sources of electric automobiles. However, since the ion-conductive polymers described above have low ion conductivity at temperatures below room temperature, it is difficult to realize small-size, light-weight batteries with high energy density which are demanded for power sources for driving portable electronic instruments and for memory back-up.

On the other hand, as means for further improving the ion conductivity more than the above-described ion-conductive polymers improve it, are proposed methods of adding organic solvents (especially preferably organic solvents with high dielectric constant such as EC or PC) to ion-conductive polymers while maintaining a solid state, as typified by Japanese Unexamined Patent Publication Nos. SHO 59 (1984)-149601 and SHO 58 (1983)-75779 and U.S. Pat. No. 4,792,504. However, in the cases where these proposed methods are used, the ion conductivity is surely improved, but film strength declines significantly. In other words, even in the cases where these proposed methods are used, there is also a possibility that electrolyte layers are deformed and destroyed by compression and slight short circuits take place after batteries or electrochromic devices are actually assembled by inserting thin films of the ion-conductive polymers between electrodes.

Further, in secondary batteries, as the volume of electrode active materials expands and contracts at charging and discharging, the electrolyte layers also receive compression and relaxation stress. Accordingly, it is also necessary to consider not only the improvement of the ion conductivity but also the improvement of mechanical properties for improving the performance of the ion-conductive polymers.

DISCLOSURE OF INVENTION

After intensive study on the above problems, the inventors of the present invention have found that the use of graphite particles having amorphous carbon attached to the surface thereof for a negative electrode active material suppresses the decomposition of an ion-conductive compound contained in an ion conductor, further reduces the decline of the mechanical strength of an electrolyte with charge-discharge cycles and improves the performance of a battery using the ion-conductive compound.

The present invention provides a polymer battery comprising a negative electrode comprising at least a carbon material as an active material, an electrolyte layer, and a positive electrode comprising at least a lithium-containing chalcogenide as an active material, characterized in that the electrolyte layer contains an ion-conductive compound and a polymer fiber, and the carbon material comprises graphite particles having amorphous carbon attached to the surface thereof.

EMBODIMENT FOR CARRYING OUT THE INVENTION

Figure 1:
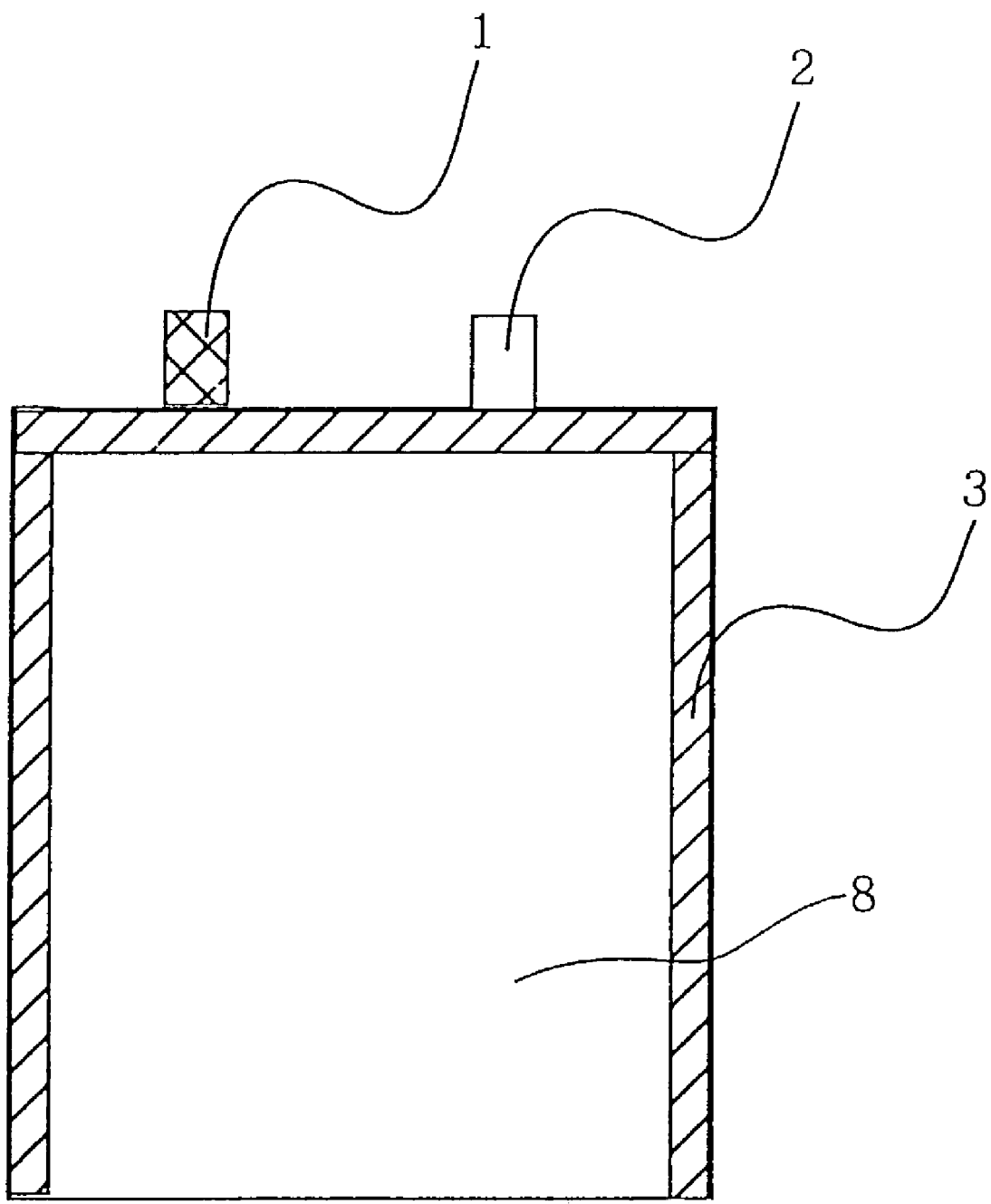
FIG. 1 is a schematic view illustrating a basic construction of a polymer battery in accordance with the present invention.

To sum up, by use of graphite particles to the surfaces of which amorphous carbon is attached for the negative electrode active material and also by use of an ion-conductive compound and a polymer fiber for the electrolyte layer, the present invention provides a polymer battery more excellent in the following points than the prior-art batteries, especially a polymer battery suitable for a small-size, light-weight battery:

1) Since the negative electrode active material is comprised of the graphite particles having amorphous carbon attached to the surface thereof, the ion-conductive compound can be prevented from decomposing. That means, it is possible to prevent explosion of the battery and leakage to the outside owing to an increase in the inner pressure of the battery caused by the generation of gas such as ethylene gas, carbon dioxide gas and others by the decomposition of the ion-conductive compound. Thus the battery is excellent in long-term reliability and safety.

2) To provide good performance and a high energy density. In the present invention, particularly, by improving the ion conductivity and the mechanical properties of the ion-conductive compound, it is possible to reduce the thickness of the film of the ion-conductive compound, thereby decreasing the inner resistance of the battery and improving the filling factor of the active materials in the battery, which leads to the achievement of the above objectives.

3) To provide extremely high workability. In the present invention, particularly, this objective is achieved by utilizing a method of putting a precursor of the ion conductive compound in the negative and positive electrodes beforehand and then crosslinking said precursor with a precursor of the ion conductive compound in the electrolyte layer by ultraviolet irradiation or by heat.

In the present invention, since the negative electrode active material is comprised of the graphite particles having amorphous carbon attached to the surface thereof, the electrolyte layer containing the ion-conductive compound can be prevented from decomposing. Thereby the leakage can be eliminated and the long-term reliability can be improved.

The graphite particles having amorphous carbon attached to the surface thereof can be obtained as follows: A particulate carbon material to be a core (referred to as "core carbon material" or "carbon material to be a core" or simply "core" hereinafter) is dipped in a raw material for a coating carbon material (for example, coal or petroleum heavy oil such as tar, pitch or the like; referred to simply as "heavy oil, etc." hereinafter), and then, is separated from the heavy oil, etc. At this time, if a specific means is adapted, a carbon material in which the surface of the core is uniformly covered with pitch can be produced. The obtained carbon material is baked to give the above-mentioned graphite particles. It has been found out that the thus obtained particles of the carbon material of two-layer structure are spherical or ellipsoidal, or in a form approximate thereto, and have a form of carbon crystals whose edges are rounded. Further, measurement by a BET method has clearly shown that the particles after the above-described treatment have a specific surface area smaller than that of the core carbon material before the treatment and that pores, which are related to the specific surface area by the BET method, are closed in some manner.

In this carbon material, pores related to the specific surface area measured by the BET method are filled by adhesion or coating of carbon of the heavy oil, etc., and the specific surface area is 5 $m^2/g$ of smaller (preferably about 1 to 5 $m^2/g$). If the specific surface area is larger than 5 $m^2/g$, it is unpreferable because a contact area with the electrolyte becomes larger and side reaction with the ion-conductive compound takes place more easily.

In the present invention, as the carbon material to be the core, is used a graphite material of high crystallinity whose average interplanar distance ($d_{002}$) in plane (002) is 0.335 to 0.340 nm, whose crystalline unit cell thickness (Lc) in a direction of plane (002) is 10 nm or more (more preferably, 40 nm or more) and whose crystalline unit cell thickness (La) in a direction of plane (110) is 10 nm or more (more preferably, 50 nm or more) by X-ray wide-angle diffraction analysis. If ($d_{002}$) is larger than 0.340 nm and (Lc) and (La) are smaller than 10 nm, it is unpreferable because the carbon material has low crystallinity and the discharge capacity decreases.

In the carbon material of the present invention, it is characteristic that the crystallinity of the amorphous carbon adhering to or coating the surface of the core is lower than the above-mentioned crystallinity of the core.

The carbon material of the present invention has an absolute specific gravity within the range of 1.50 to 2.26 $g/cm^3$. If the absolute specific gravity is lower than 1.50 $g/cm^3$, it is not preferable because the filling factor of the negative electrode active material in the battery is low and the energy density is low. If the absolute specific gravity is higher than 2.26 $g/cm^3$, the carbon material forms graphite single crystal and become poor in formability as a battery material.

The electrolyte layer contains an ion-conductive compound, a polymer fiber and optionally a Li salt. Particularly, the ion-conductive compound is preferably comprised of a crosslinked product obtained by crosslinking at least one of precursors of ion-conductive compounds represented by the following formulae:

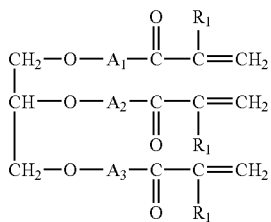

(wherein $R_1$ is a hydrogen atom or methyl group, $A_1$, $A_2$ and $A_3$ are bivalent residues having at least three ethylene oxide units (EO) and optionally containing a propylene oxide unit (PO), and the numbers of PO and EO satisfy PO/EO=0 to 5 and EO+PO$\geq$35),

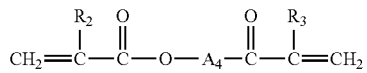

(wherein $R_2$ and $R_3$ are independently a hydrogen atom or methyl group, $A_4$ is a bivalent residue having at least three ethylene oxide units (EO) and optionally containing a propylene oxide unit (PO), and the numbers of PO and EO satisfy PO/EO=0 to 5 and EO+PO$\geq$35), and

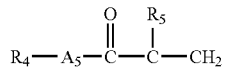

(wherein $R_4$ and $R_5$ are independently a hydrogen atom or a methyl group, $A_5$ is a bivalent residue having at least three ethylene oxide units (EO) and optionally containing a propylene oxide unit (PO), and the numbers of PO and EO satisfy PO/EO=0 to 5 and EO+PO$\geq$35).

Acrylates which are the following precursors of ion-conductive compounds are preferred since their crosslinking reaction degree is high. That is because the reactivity of the acrylates is considered higher in the crosslinking reaction since methyl groups of methacrylates make steric hindrance. In the following formulae, methyl, ethyl, propyl and the like are mentioned as lower alkyl groups having a carbon number of one or more.

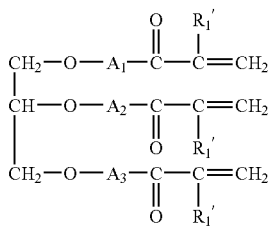

(wherein $R_1'$ is a hydrogen atom or a lower alkyl group having a carbon number of one or more, $A_1$, $A_2$ and $A_3$ are bivalent residues containing three or more ethylene oxide units (EO) or containing ethylene oxide units and (a) propylene oxide unit(s) (PO), and the numbers of PO and EO satisfy PO/EO=0 to 5 and EO+PO$\geq$10),

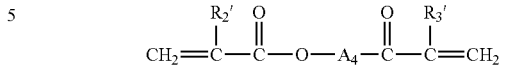

(wherein $R_2'$ and $R_3'$ are independently a hydrogen atom or a lower alkyl group having a carbon number of one or more, $A_4$ is a bivalent residue containing at least three ethylene oxide units (EO) or containing ethylene oxide units and (a) propylene oxide unit(s) (PO), and the numbers of PO and EO satisfy PO/EO=0 to 5 and EO+PO$\geq$10),

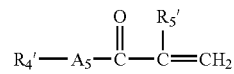

(wherein $R_4'$ and $R_5'$ are independently a hydrogen atom or a lower alkyl group having a carbon number of one or more, $A_5$ is a bivalent residue containing at least three ethylene oxide units (EO) or containing ethylene oxide units and (a) propylene oxide unit(s) (PO), and the numbers of PO and EO satisfy PO/EO=0 to 5 and EO+PO$\geq$3).

The Li salt is preferably at least one of $LiBF_4$, $LiPF_6$ and $LiN(CF_3SO_2)_2$, but is not limited thereto.

The ion-conductive compound may be used as a gel which contains an organic solvent and the Li salt. As the organic solvent, may be mentioned cyclic carbonates such as propylene carbonate, ethylene carbonate, etc.; cyclic esters such as γ-butyrolactone, etc.; chain esters such as methyl propionate, ethyl propionate, etc.; chain carbonates such as diethyl carbonate, dimethyl carbonate, methylethyl carbonate, etc.; ethers such as tetrahydrofuran and its derivatives, 1,3-dioxane, 1,2-dimethoxyethane, methyl diglyme, etc.; nitrites such as acetonitrile, benzonitrile, etc.; dioxolan and its derivatives; sulfolan and its derivatives, which may be used singly or as a combination of two or more thereof. However, the organic solvent is not limited to these compounds. The blending ratio and blending method therefor are not limited.

Is particularly preferred a gel containing an organic electrolyte in which the Li salt is dissolved in a mixed organic solvent of ethylene carbonate (EC) with one or more solvents selected from propylene carbonate (PC), γ-butyrolactone (GBL), ethylmethyl carbonate (EMC), dimethyl carbonate (DMC) and diethyl carbonate (DEC), since the solvent does not decompose easily in the negative electrode comprised of a graphite type carbon material as an active material.

Here, the weight ratio of the ion-conductive compound to the organic electrolyte is preferably within the range of 30:70 to 2:98. If the weight ratio of the ion-conductive compound is higher than 30, the ion conductivity is not sufficient, and if the weight ratio of the ion-conductive compound is lower than 2, sufficient mechanical strength is not obtained.

Preferably, the content of EC in the organic electrolyte is 2 to 55 wt % and the content of the Li salt is 3 to 35 wt % because the ion conductivity is satisfactory enough. Further, if the content of EC is 2 to 35 wt %, the decrease of the ion conductivity at low temperatures is reduced.

The polymer fiber of the electrolyte layer (a fibrous organic compound) has high stability to the organic solvent if it is comprised of at least one of a polypropylene fiber, a polyethylene fiber and a polyester fiber. These polymer fibers may form nonwoven textiles having a gas permeability of 1 to 500 sec/cm$^3$. A gas permeability lower than 1 sec/cm$^3$ is not preferable because the ion conductivity is not enough, and a gas permeability higher than 500 sec/cm$^3$ is not preferable because the mechanical strength is not enough and short circuits are liable to occur. Here the gas permeability means a volume of air transmitted per unit time period when air is applied onto 1 cm$^2$ of nonwoven textile at a pressure of 124.5 Pa in accordance with a Frajour test method described in JIS L1096 6.27.1.

Further, the weight ratio of the ion-conductive compound to the polymer fiber of the electrolyte layer may suitably be within the range of 91:9 to 50:50. If the weight ratio of the ion-conductive compound is higher than 91, it is not preferable because the mechanical strength is not enough, and if the ratio is lower than 50, it is not preferable because the ion conductivity is not enough.

The electrolyte layer may be formed by crosslinking the precursor of the ion-conductive compound, which has been put in either the negative electrode or the positive electrode beforehand, with the precursor of the ion-conductive compound, which has been put in the fibrous organic compound beforehand. Thereby, adhesion at the interface between the electrode and the electrolyte layer can be improved, and the cycle characteristics and high-current discharge characteristics of the battery can be improved.

As a crosslinking method, may be used a method using energy of light such as an ultraviolet ray, an electron beam, visible light or the like and a thermal method. It is also important to use a polymerization initiator, if necessary. In the crosslinking method using an ultraviolet ray or heat, especially, it is preferable to add several percent or less of the polymerization initiator. As the polymerization initiators, commercially available products may be used such as 2,2-dimethoxy-2-phenylacetophenone (DMPA), benzoyl peroxide (BPO) and the like. The wavelength of the ultraviolet ray may suitably be 250 to 360 nm.

The positive electrode active material may preferably be a lithium-containing chalcogen compound because it already contains a lithium source for lithium intercalation into the negative electrode of carbon, which is necessary for the first charging. A lithium-containing metal oxide, especially, allows the production of a battery having a high energy density because its charge/discharge potential is high. As examples thereof, may be mentioned $LiCoO_2$, $LiNiO_2$, $LiMnO_2$, $LiMn_2O_4$ and $LiCo_xNi_{(1-x)}O_2$ ($0<X<1$), but the lithium-containing metal oxide is not limited to these examples.

When the above-mentioned positive and negative electrode layers are formed, a binder and/or a conductor may be added as appropriate for the purpose of obtaining a uniformly mixed disperse coating liquid (paste) and/or for the purpose of improving characteristics (discharge characteristics and charge/discharge cycle characteristics) of mixed materials for the positive electrode and for the negative electrode.

In the case where the binder is used, may be mentioned a method using, as a coating liquid, a binder solution of a thermoplastic resin and a polymer having rubber elasticity dissolved in a solvent, in which the electrode active material and, if desired, the above-mentioned ion-conductive compound are dispersed.

As examples of the above-mentioned binders, the following may be mentioned: polymers of acrylonitrile, methacrylonitrile, vinylidene fluoride, vinyl fluoride, chloroprene, vinyl pyrrolidone, vinyl pyridine, styrene and its derivatives, vinylidene chloride, ethylene, propylene, dienes (e.g., cyclopentadiene, 1,3-cyclohexadiene, butadiene, etc.), and copolymers of these compounds. Particular examples include polyacrylonitrile, polyvinylidene fluoride, polyvinyl pyrrolidone, polyethylene, polypropylene, ethylene-propylene-diene terpolymer (EPDM), sulfonated EPDM, styrene-butadiene rubber and the like.

The conductor may desirably be an electron conductive material that does not hinder battery reaction by the electrodes and does not undergo chemical reaction. Typically, conductive materials such as artificial graphite, natural graphite (scaly graphite, flaky graphite, etc.), carbon black, acetylene black, Ketchen black, carbon fiber, powdered metals, conductive metal oxides and the like may be mixed in the mixed materials for the positive electrode and for the negative electrode for the purpose of improving the electron conductivity.

The amount of the binder added is not particularly limited, but may preferably be within the range of 1 to 25 wt % in the electrode. The amount of the conductor added is not particularly limited either, but may preferably be within the range of 2 to 15 wt % in the electrode.

The mixed materials for the positive electrode and for the negative electrode of the present invention may desirably be applied onto a positive electrode collector and a negative electrode collector in a uniform thickness, for example, using means such as roll coating using an applicator roll or the like, a doctor blade method, spin coating, bar coater or the like. However, these means are not limitative ones. In the case where these means are used, it is possible to increase an actual surface area of the electrode active material contacting the electrolyte layer and a current collector. This enables the electrodes to be disposed in a thickness and a shape according to use.

The battery may be produced either after the method of making present the precursor of the ion-conductive compound of the present invention both in the positive or negative electrode layer and in the electrolyte layer or after the method of making present precursors of the ion-conductive compound in the positive electrode, in the negative electrode and in the electrolyte layer. Especially, according to the present invention, the former method enables either one of two interfaces between the positive electrode layer/the electrolyte layer/the negative electrode layer to be eliminated and the ion conductivity of the battery to be raised. Further, by the former method, it is possible to simultaneously crosslink the precursor of the ion-conductive compound in the polymer fiber and that in one of the mixed materials for the electrodes, and therefore, the production process can be simplified.

For the positive electrode collector, are preferred materials such as aluminum, stainless steel, titanium, copper and the like, and for the negative electrode collector, are preferred materials such as stainless steel, iron, nickel, copper. These materials, however, are not limitative ones. The collectors may be in the form of foil, mesh, expanded metal, lath, porous substance, resin film coated with an electron conductive material, but their form is not limited thereto.

The battery may be in the shape of a cylinder, coin, film, card and the like, but its shape is not limited thereto. As package materials, may be mentioned metals, resins and the like.

EXAMPLES

The present invention is now explained in detail with reference to examples, which should not be construed to limit the scope of the invention.

In all the following examples and comparative examples, when used precursors of ion-conductive compounds were crosslinked by ultraviolet rays, an initiator DMPA was used in an amount of 0.1 wt % of the precursors.

Figure 2:
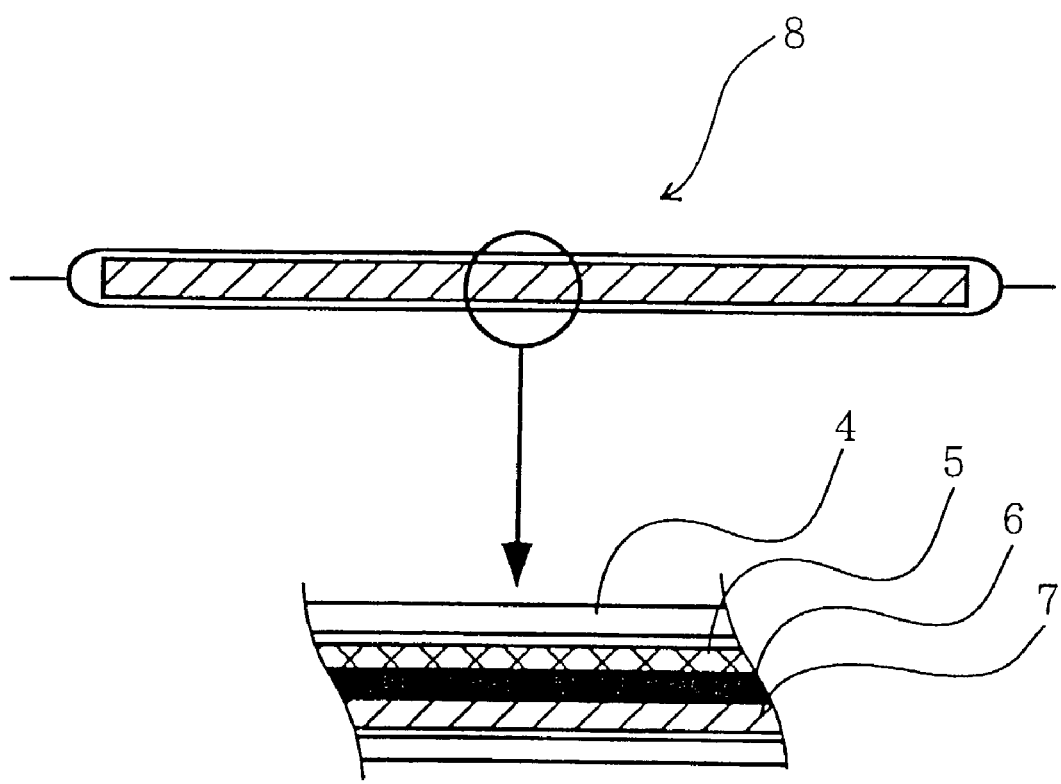
FIG. 2 is a schematic sectional view illustrating the construction of a polymer battery in accordance with Example 1 of the present invention, including an enlarged view of an essential part of the battery.

FIG. 1 and FIG. 2 are schematic views illustrating basic constructions of polymer batteries produced in the present invention.

First, in FIGS. 1 and 2, a polymer battery 8 is composed mainly of a positive electrode 5, an electrolyte layer 6, a negative electrode 7 and a package 4. Further, reference numeral 1 denotes a terminal of the negative electrode 7, 2 a terminal of the positive electrode 5 and 3 a sealing member of the package 4.

Example 1

Polyvinylidene fluoride (PVDF), 9 wt %, was mixed as a binder with carbon material particles having amorphous carbon attached to the surface thereof whose (d002) was 0.336 nm, (Lc) was 100 nm and (La) was 97 nm by X-ray wide-angle diffraction analysis and whose specific surface area was 2 m²/g by the BET method. With the resulting mixture, N-methyl-2-pyrrolidone (NMP) was mixed and dissolved to give a paste. The paste was coated onto a rolled copper foil of 20 μm thickness, dried and pressed to give a negative electrode. The area of this electrode was 9 cm² and its thickness was 85 μm.

With powdered $LiCoO_2$ of 7 μm average particle diameter, were added 7 wt % of PVDF as a binder and 5 wt % of acetylene black of 2 μm average particle diameter as a conductor. With the resulting mixture, NMP was mixed and dissolved to give a paste. The paste was coated onto a rolled aluminum foil of 20 μm thickness, dried and pressed to give a positive electrode. The area of this electrode was 9 cm² and its thickness was 80 μm.

The polymer fiber contained in the electrolyte layer was a nonwoven textile of polyester having a gas permeability of 380 sec/cm³, an area of 10 cm² and a thickness of 20 μm.

These negative electrode, positive electrode and polymer fiber were immersed in a mixture solution of the following compound $K_1$ with an average molecular weight of 7500 to 9000 which was a precursor of an ion-conductive compound:

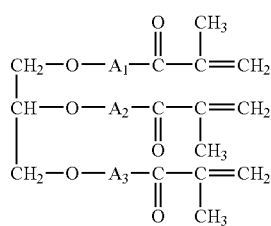

(wherein $A_1$, $A_2$ and $A_3$ are bivalent residues containing at least three ethylene oxide units (EO) and optionally a propylene oxide unit (PO) and the numbers of PO and EO satisfy PO/EO=0.25), the following compound $K_2$ with an average molecular weight of 3500 to 4500 which was a precursor of an ion-conductive compound:

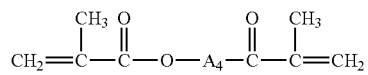

(wherein $A_4$ is a bivalent residue containing at least three ethylene oxide units (EO) and optionally a propylene oxide unit (PO), and the numbers of PO and EO satisfy PO/EO 0.25), and the following compound $K_3$ with an average molecular weight of 400 to 550 which was a precursor of an ion-conductive compound:

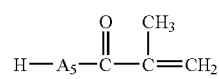

(wherein $A_5$ is a bivalent residue containing at least three ethylene oxide units (EO) and a propylene oxide unit (PO), and the numbers of PO and EO satisfy PO/EO=0.25) in equivalent weight ratios, the mixture solution containing 4.5 wt % of $LiBF_4$ dissolved therein, and allowed to stand under reduced pressure for 15 minutes in order that the precursors penetrated inside pores.

The polymer fiber which formed a composite with the precursors of the ion-conductive compounds was laminated on the negative electrode which formed a composite with the precursors of the ion-conductive compounds. The resulting laminate was irradiated from above with an ultraviolet ray of 350 nm wavelength at an intensity of 30 mW/cm² for three minutes. At this time, the weight ratio of the ion-conductive compounds to the polymer fiber was 90:10.

The positive electrode which formed a composite with the precursors of the ion-conductive compounds, as it was, was irradiated from above with an ultraviolet ray of 350 nm wavelength at an intensity of 30 mW/cm² for three minutes.

The resulting composite of the negative electrode, the polymer fiber and the ion-conductive compounds was bonded to the composite of the positive electrode and the ion-conductive compounds to produce a battery using the ion-conductive compounds. The total thickness of these positive electrode layer/electrolyte layer/negative electrode layer was 190 μm.

Comparative Example 1

PVDF as a binder, 9 wt %, was mixed with artificial graphite particles whose (d002) was 0.337 nm, (Lc) was 100 nm and (La) was 100 nm by X-ray wide-angle diffraction analysis and whose specific surface area was 10 m²/g by the BET method. NMP was admixed and dissolved to give a paste. The paste was coated onto a rolled copper foil of 20 μm thickness, dried and pressed to give a negative electrode. The area of this electrode was 9 cm² and its thickness was 83 μm.

As the positive electrode, was used the same as used in Example 1.

The electrolyte layer and the battery were also made in the same manner as in Example 1. The total thickness of the obtained positive electrode layer/electrolyte layer/negative electrode layer was 188 μm.

The batteries of Example 1 and Comparative Example 1 were charged at a constant current of 2.3 mA until they reached a battery voltage of 4.1 V. After they reached 4.1 V, the batteries were charged at the constant current for the total charge time of 12 hours. The batteries were discharged at a constant current of 2.3 mA until they reached a battery voltage of 2.75 V. The cycle characteristics of the batteries were evaluated under these charge/discharge conditions. The results are shown in FIG. 3.

Figure 3:
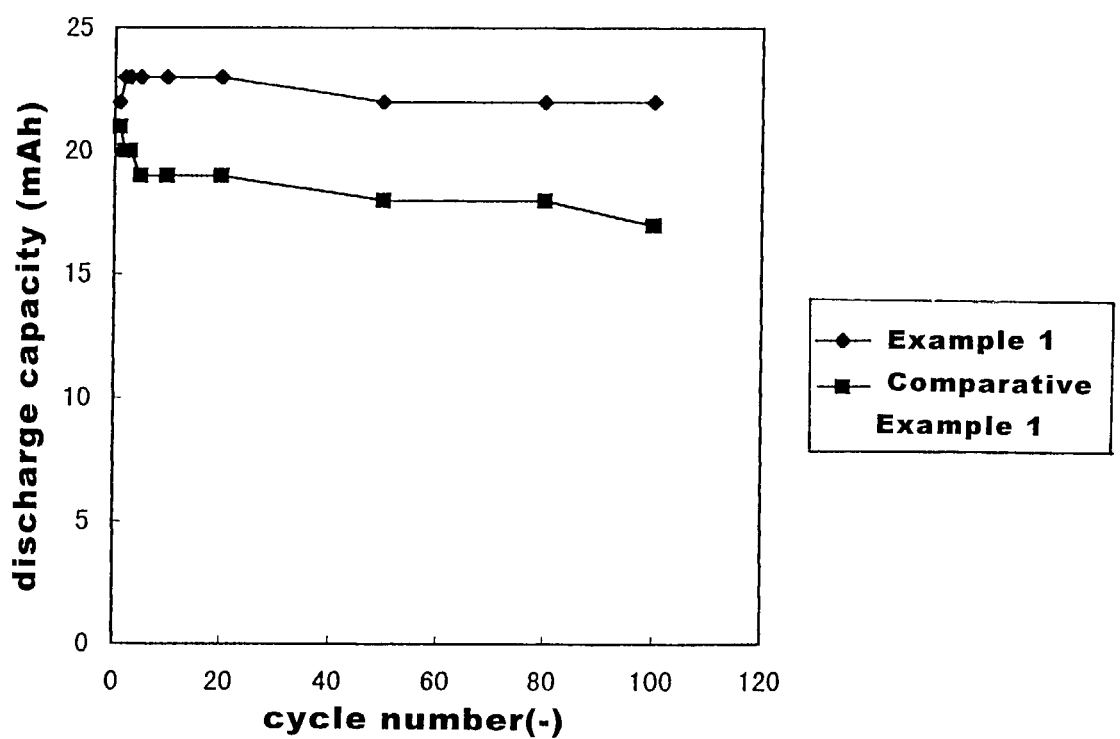
FIG. 3 is a graphical representation showing charge-discharge cycle characteristics of polymer batteries of Example 1 and Comparative Example 1 in accordance with the present invention.

From the results and FIG. 3, it is found that the battery using the carbon material having the amorphous carbon attached to the surface thereof is excellent in the cycle characteristics since the decomposition of the ion-conductive compound in the electrolyte layer and the destroy of the negative electrode/electrolyte layer interface is suppressed better.

Example 2

PVDF as a binder, 7 wt %, was mixed with carbon material particles having amorphous carbon attached to the surface thereof whose (d002) was 0.337 nm, (Lc) was 100 nm and (La) was 95 nm by X-ray wide-angle diffraction analysis and whose specific surface area was 5 m²/g by the BET method. NMP was admixed and dissolved to give a paste. The paste was coated onto an electrolytic copper foil of 18 μm thickness, dried and pressed to give a negative electrode. The area of this electrode was 9 cm² and its thickness was 80 μm.

With powdered LiCoO$_2$ of 5 μm average particle diameter, were added 4 wt % of PVDF as a binder and 9 wt % of acetylene black of 2 μm average particle diameter as a conductor. NMP was admixed and dissolved to give a paste. The paste was coated onto a rolled aluminum foil of 20 μm thickness, dried and pressed to give a positive electrode. The area of this electrode was 9 cm² and its thickness was 85 μm.

The polymer fiber contained in the electrolyte layer was a nonwoven textile of polypropylene (PP) having a gas permeability of 250 sec/cm³, an area of 10 cm² and a thickness of 20 μm.

An electrolyte was prepared in which 13 wt % of LiPF$_6$ was dissolved in a mixed solvent of EC and EMC (the EC content: 35 wt %). The electrolyte was mixed with the following compound K$_4$ with an average molecular weight of 7500 to 9000 which was a precursor of an ion-conductive compound:

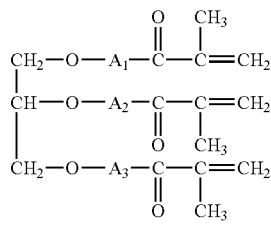

(wherein A$_1$, A$_2$ and A$_3$ are bivalent residues containing at least three ethylene oxide units (EO) and optionally a propylene oxide unit (PO) and the numbers of PO and EO satisfy PO/EO=0.25) in a weight ratio of 90:10. Thereafter, the negative electrode, the positive electrode and the polymer fiber were allowed to stand under reduced pressure for five minutes. The above-described mixed solution of the electrolyte and the precursor compound K$_4$ was poured thereon and allowed to stand for another five minutes.

The polymer fiber which formed a composite with the precursor of the ion-conductive compound and the electrolyte was laminated on the negative electrode which formed a composite with the precursor of the ion-conductive compound and the electrolyte. The resulting laminate was irradiated from above with an ultraviolet ray of 350 nm wavelength at an intensity of 40 mW/cm² for three minutes. At this time, the weight ratio of the ion-conductive compound to the polymer fiber was 85:15.

The positive electrode which formed a composite with the precursor of the ion-conductive compound and the electrolyte was irradiated from above with an ultraviolet ray of 350 nm wavelength at an intensity of 40 mW/cm² for three minutes.

The resulting composite of the negative electrode, the polymer fiber and the ion-conductive gel was bonded to the composite of the positive electrode and the ion-conductive gel to produce a battery using the ion-conductive compound. The total thickness of these positive electrode layer/electrolyte layer/negative electrode layer was 190 μm.

Comparative Example 2

For the negative electrode, the polymer fiber contained in the electrolyte and the positive electrode, the same ones as used in Example 2 were used.

However, the negative electrode, the polymer fiber and the positive electrode were separately formed into composites with an ion-conductive gel whose precursor was the same as the precursor compound K$_4$ in Example 2. The composites were bonded to each other to produce a battery using the ion-conductive compound. The total thickness of these positive electrode layer/electrolyte layer/negative electrode layer was 195 μm.

Comparative Example 3

For the negative electrode and the positive electrode, the same ones as used in Example 2 were used.

However, the polymer fiber was not contained in the electrolyte layer. The negative electrode and the positive electrode were separately formed into composites with an ion-conductive gel whose precursor was the same as the precursor compound K$_4$ in Example 2. The negative electrode and the positive electrode having formed the composites with the ion-conductive gel were bonded to each other to produce a battery using the ion-conductive compound. The total thickness of these positive electrode layer/electrolyte layer/negative electrode layer was 170 μm.

Figure 4:
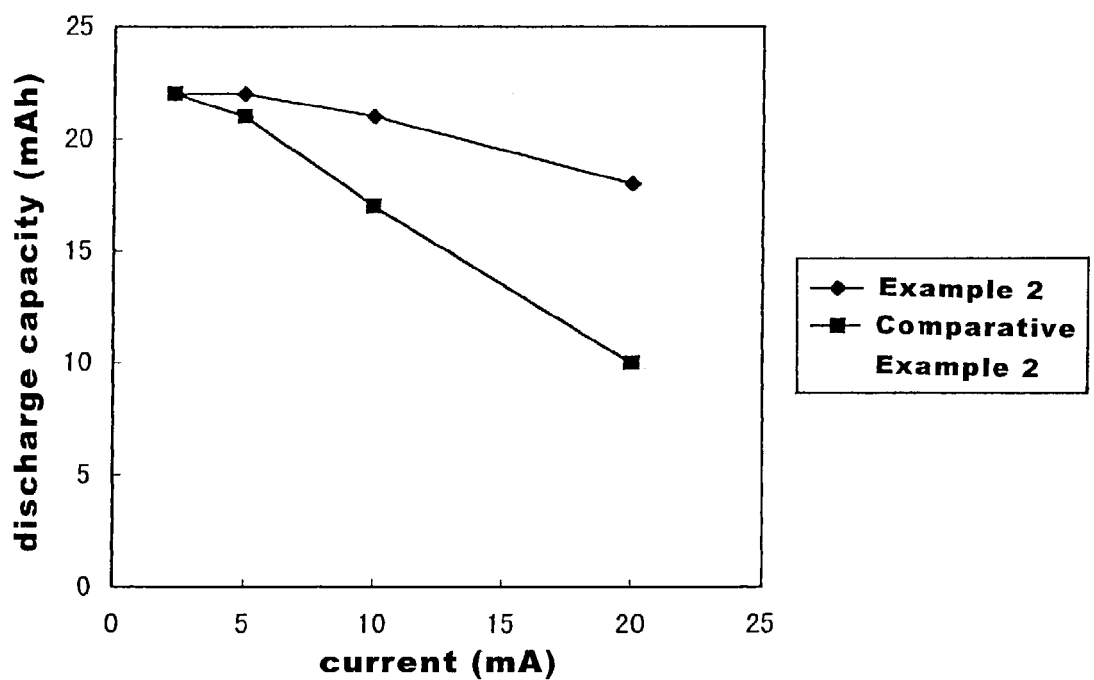
FIG. 4 is a graphical representation showing dependency (average value) of discharge capacity on discharge current regarding 10 polymer batteries of Example 2 and Comparative Example 2 each.

The batteries of Example 2 and Comparative Examples 2 and 3 were charged at a constant current of 2.3 mA until they reached a battery voltage of 4.1 V. After they reached 4.1 V, the batteries were charged at the constant current for the total charge time of 12 hours. The batteries were discharged at constant currents of 2.3 mA, 5 mA, 10 mA and 20 mA until they reached a battery voltage of 2.75 V. The results of a charge/discharge test under the above conditions are shown in FIG. 4.

The results of this test shows that seven out of ten batteries of Comparative Examples 3 short-circuited during the initial charge, while none of batteries of Example 2 and Comparative Example 2 short-circuited. Regarding the discharge capacity versus discharge currents, the batteries of Example 2 exhibited a higher discharge capacity at a higher discharge current as understood from FIG. 4. Therefore, it has been found that a battery produced by bonding the positive electrode layer to the simultaneously crosslinked negative electrode layer and electrolyte layer containing the polymer fiber has a reduced contact interface, and furthermore allows the thickness of the ion-conductive compound layer to be reduced, and thus the discharge load characteristics are improved. It has also been found that, in the case where the polymer fiber is not formed into a composite with the electrolyte layer, the thickness of the ion-conductive compound layer can be reduced, but the mechanical strength weakens and the battery is liable to short-circuit.

Example 3

PVDF as a binder, 7 wt %, was mixed with carbon material particles having amorphous carbon attached to the surface thereof whose (d002) was 0.339 nm, (Lc) was 60 nm and (La) was 40 nm by X-ray wide-angle diffraction analysis and whose specific surface area was 5 $m^2/g$ by the BET method. NMP was admixed and dissolved to give a paste. The paste was coated onto an electrolytic copper foil of 18 μm thickness, dried and pressed to give a negative electrode. The area of this electrode was 9 $cm^2$ and its thickness was 85 μm.

With powdered $LiCoO_2$ of 7 μm average particle diameter, were added 4 wt % of PVDF as a binder and 9 wt % of acetylene black of 2 μm average particle diameter as a conductor. NMP was admixed and dissolved to give a paste. The paste was coated onto a rolled aluminum foil of 20 μm thickness, dried and pressed to give a positive electrode. The area of this electrode was 9 $cm^2$ and its thickness was 80 μm.

The polymer fiber contained in the electrolyte layer was a nonwoven textile of polyester having a gas permeability of 490 $sec/cm^3$, an area of 10 $cm^2$ and a thickness of 25 μm.

An electrolyte was prepared in which 15 wt % of LiN$(CF_3O_2)_2$ was dissolved in a mixed solvent of EC and DMC (the EC content: 20 wt %). The electrolyte was mixed with a precursor of an ion-conductive compound with an average molecular weight of 7500 to 9000 which was the same as the precursor compound $K_4$ in Example 2 in a weight ratio of 95:5. Thereafter, the negative electrode, the positive electrode and the polymer fiber were allowed to stand under reduced pressure for two minutes. The above-described mixed solution was poured thereon and allowed to stand for another fifteen minutes.

The polymer fiber which formed a composite with the precursor of the ion-conductive compound and the electrolyte was laminated on the negative electrode which formed a composite with the precursor of the ion-conductive compound and the electrolyte. The resulting laminate was irradiated from above with an ultraviolet ray of 360 nm wavelength at an intensity of 40 $mW/cm^2$ for two minutes. At this time, the weight ratio of the ion-conductive compound to the polymer fiber was 50:50.

The positive electrode which formed a composite with the precursor of the ion-conductive compound and the electrolyte was from above irradiated with an ultraviolet ray of 350 nm wavelength at an intensity of 40 $mW/cm^2$ for two minutes.

The resulting composite of the negative electrode, the polymer fiber and the ion-conductive gel was bonded to the composite of the positive electrode and the ion-conductive gel to produce a battery using the ion-conductive compound. The total thickness of these positive electrode layer/electrolyte layer/negative electrode layer was 195 μm.

Comparative Example 4

A battery was produced in the same manner as in Example 3 except that the gas permeability of a nonwoven textile of polyester in the electrolyte layer was 510 $sec/cm^3$ and the weight ratio of the ion-conductive compound and the polymer fiber was 97:3.

Comparative Example 5

A battery was produced in the same manner as in Example 3 except that the polymer fiber in the electrolyte layer is a nonwoven textile of PP having a gas permeability of 0.5 $sec/cm^3$, an area of 10 $cm^2$ and a thickness of 20 μm and the weight ratio of the ion-conductive compound to the polymer fiber was 40:60.

Figure 5:
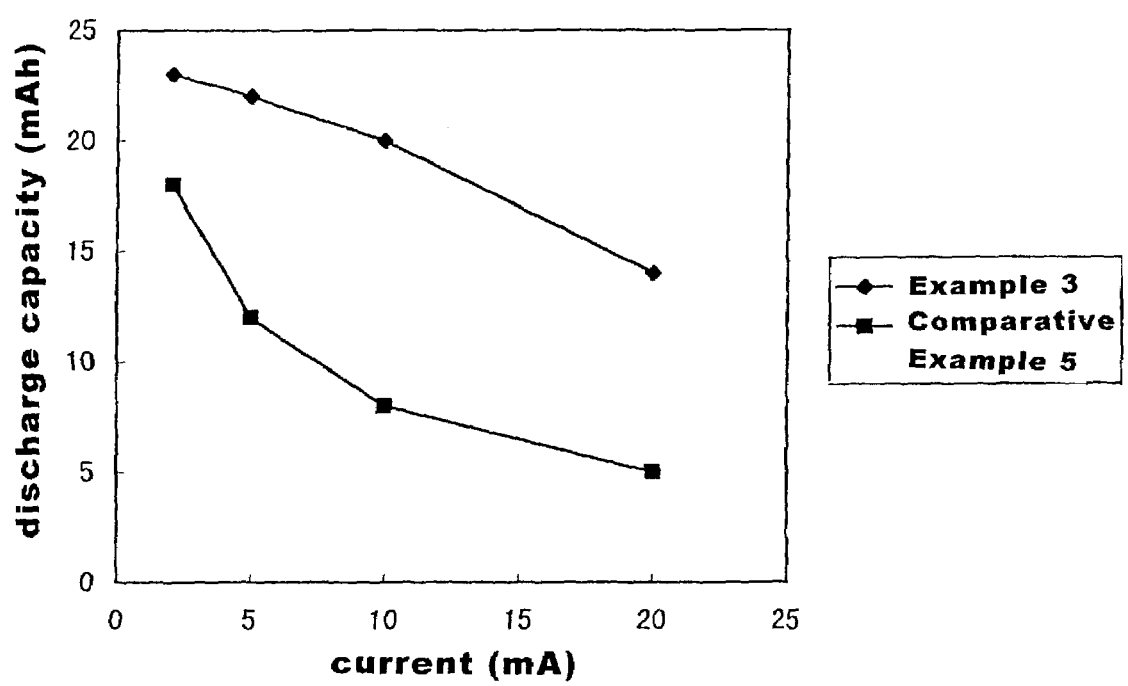
FIG. 5 is a graphical representation showing dependency (average value) of discharge capacity on discharge current regarding 10 polymer batteries of Example 3 and Comparative Example 5 each.

The batteries of Example 3 and Comparative Examples 4 and 5 were charged at a constant current of 2.1 mA until they reached a battery voltage of 4.1 V. After they reached 4.1 V, the batteries were charged at the constant voltage for the total charge time of 12 hours. The batteries were discharged at constant currents of 2.1 mA, 5 mA, 10 mA and 20 mA until they reached a battery voltage of 2.75 V. The results of a charge/discharge test under these conditions are shown in FIG. 5.

In this test, five out of ten batteries of Comparative Example 4 short-circuited during the initial charge, while none of batteries of Example 3 and Comparative Example 5 short-circuited. Regarding the discharge capacity versus discharge currents, the batteries of Example 3 exhibited a higher discharge capacity at a higher current as understood from FIG. 5. Therefore, it has been found that, if the gas permeability of the polymer fiber in the electrolyte layer exceeds 500 $sec/cm^3$, the mechanical strength of the electrolyte layer declines and short circuit is easily induced, and that, if the gas permeability of the polymer fiber is below 1 $sec/cm^3$, openings in the polymer fiber decreases and the resistance of the electrolyte layer rises, which results in a decline in the discharge load characteristics of the battery.

Example 4

PVDF as a binder, 7 wt %, was mixed with carbon material particles having amorphous carbon attached to the surface thereof whose (d002) was 0.338 nm, (Lc) was 100 nm and (La) was 100 nm by X-ray wide-angle diffraction analysis and whose specific surface area was 3 $m^2/g$ by the BET method. NMP was admixed and dissolved to give a paste. The paste was coated onto an electrolytic copper foil of 18 μm thickness, dried and pressed to give a negative electrode. The area of this electrode was 9 $cm^2$ and its thickness was 83 μm.

With powdered $LiCoO_2$ of 10 μm average particle diameter, were added 3 wt % of PVDF as a binder and 6 wt % of acetylene black of 2 μm average particle diameter as a conductor. NMP was admixed and dissolved to give a paste. The paste was coated onto a rolled aluminum foil of 20 μm thickness, dried and pressed to give a positive electrode. The area of this electrode was 9 $cm^2$ and its thickness was 80 μm.

The polymer fiber contained in the electrolyte layer was a nonwoven textile of PP having a gas permeability of 350 $sec/cm^3$, an area of 10 $cm^2$ and a thickness of 20 μm.

An electrolyte was prepared in which 12 wt % of $LiBF_4$ was dissolved in a mixed solvent of EC and EMC (the EC content: 55 wt %). The electrolyte was mixed with a precursor of an ion-conductive compound with an average molecular weight of 7500 to 9000 which was the same as the precursor compound $K_4$ in Example 2 in a weight ratio of 95:5. Thereafter, the negative electrode, the positive electrode and the polymer fiber were allowed to stand under reduced pressure for two minutes. The above-described mixed solution was poured thereon, and allowed to stand for another fifteen minutes.

The polymer fiber which formed a composite with the precursor of the ion-conductive compound and the electrolyte was laminated on the negative electrode which formed a composite with the precursor of the ion-conductive compound and the electrolyte. The resulting laminate was irradiated from above with an ultraviolet ray of 360 nm wavelength at an intensity of 40 mW/cm² for two minutes. At this time, the weight ratio of the ion-conductive compound to the polymer fiber was 75:25.

The positive electrode which formed a composite with the precursor of the ion-conductive compound and the above-described electrolyte was irradiated from above with an ultraviolet ray of 355 nm wavelength at an intensity of 40 mW/cm² for two minutes.

The resulting composite of the negative electrode, the polymer fiber and the ion-conductive gel was bonded to the composite of the positive electrode and the ion-conductive gel to produce a battery using the ion-conductive compound. The total thickness of these positive electrode layer/electrolyte layer/negative electrode layer was 185 µm.

Example 5

A battery similar to that of Example 4 was produced except that, in the electrolyte, 14 wt % of $LiBF_4$ was dissolved in a mixed solvent of EC and GBL (the EC content: 35 wt %).

Example 6

A battery similar to that of Example 4 was produced except that, in the electrolyte, 13 wt % of $LiBF_4$ was dissolved in a mixed solvent of EC and DEC (the EC content 30 wt %).

Example 7

A battery similar to that of Example 4 was produced except that, in the electrolyte, 12 wt % of $LiPF_6$ was dissolved in a mixed solvent of EC, PC and EMC (EC:PC:DEC=3:30:67 by weight).

Comparative Example 6

A battery similar to that of Example 4 was produced except that, in the electrolyte, 12 wt % of $LiPF_6$ was dissolved in a mixed solvent of EC and DMC (the EC content: 60 wt %).

The batteries of Examples 4 to 7 and Comparative Example 6 were charged at a constant current of 2.0 mA until they reached a battery voltage of 4.1 V. After they reached 4.1 V, the batteries were charged at the constant voltage for the total charge time of 12 hours. The batteries were discharged at constant current of 2.0 mA until they reached a battery voltage of 2.75 V. The initial discharge was carried out at a temperature of 25° C. and the second discharge was carried out at a temperature of −20° C. The following tables show the ratio of the second discharge capacity to the first discharge capacity.

TABLE 1

|  | Number of Short Circuits at First Charge |
| --- | --- |
| Example 2 | 0/10 |
| Comparative Example 2 | 0/10 |
| Comparative Example 3 | 7/10 |

TABLE 2

|  | Number of Short Circuits at First Charge |
| --- | --- |
| Example 6 | 0/10 |
| Comparative Example 4 | 5/10 |
| Comparative Example 5 | 0/10 |

TABLE 3

|  | First Discharge Capacity (mAh) | (Second (−20° C.) Discharge Capacity/(First Discharge Capacity) |
| --- | --- | --- |
| Example 4 | 23 | 0.33 |
| Example 5 | 22 | 0.65 |
| Example 6 | 23 | 0.50 |
| Example 7 | 22 | 0.62 |
| Comparative Example 6 | 23 | 0.08 |

As shown in Table 2 and further as shown in the following table, it has been proved that a battery in which the content of EC exceeds 55 wt % hardly discharge in a low-temperature ambience at −20° C. It has also been proved that the use of the carbon material having amorphous carbon attached to the surface thereof can avoid the decomposition of PC almost completely. Therefore, it has been found that the carbon material having amorphous carbon attached to the surface thereof used in the present invention lessens the decomposition of the ion-conductive compound and is a material for negative electrodes of batteries excellent in reliability and safety.

Example 8 a) PVDF as a binder, 9 parts by weight, was mixed with 100 parts by weight of carbon material particles comprising graphite particles having amorphous carbon attached to the surface thereof whose (d002) was 0.336 nm, (Lc) was 100 nm and (La) was 97 nm by X-ray wide-angle diffraction analysis and whose specific surface area was 2 m²/g by the BET method. NMP was admixed and dissolved to give a paste. The paste was coated onto a rolled copper foil of 20 µm thickness, dried and pressed to give a negative electrode. The area of this electrode was 9 cm² and its thickness was 85 µm.

An electrolyte was prepared in which 1.0 mol/L of $LiBF_4$ was dissolved in a mixed solvent of EC, PC, GBL and EMC (EC:PC:GBL:EMC=30:20:20:30 (volume %)). The electrolyte was mixed with the following compounds $K_5$ and $K_6$ which were precursors of ion-conductive polymers in a weight ratio of 90:5:5. To the resulting mixture, DMPA 1000 ppm was added to prepare a polymerization liquid.

The compound K₅ has an average molecular weight of 7500 to 9000 and is represented by the following formula:

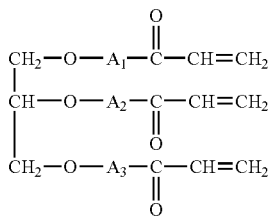

(wherein A₁, A₂ and A₃ are bivalent residues containing at least three EO and optionally PO and the numbers of PO and EO satisfy PO/EO=0.25).

The compound K₆ has an average molecular weight of 2500 to 3500 and is presented by the following formula:

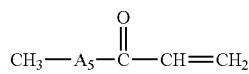

(wherein A₅ is a bivalent residue containing at least three EO and optionally PO, and the numbers of PO and EO satisfy PO/EO=0.25).

The above-mentioned negative electrode was allowed to stand under reduced pressure for five minutes and the above-described mixed solution was poured onto the negative electrode, which was then allowed to stand for another 15 minutes.

(b) A nonwoven textile of polyester having a gas permeability of 380 sec/cm³, an area of 10 cm² and a thickness of 20 μm was used as a fibrous organic compound of the electrolyte layer.

An electrolyte was prepared in which 1.0 mol/L of LiBF₄ was dissolved in a mixed solvent of EC, PC, GBL and EMC (EC:PC:GBL:EMC=30:20:20:30 (volume %)). The electrolyte was mixed with the compounds K₅ and K₆ which were precursors of ion-conductive polymers in a weight ratio of 90:5:5. To the resulting mixture, DMPA 1000 ppm was added to prepare a polymerization liquid.

Thereafter, the fibrous organic compound having formed a composite with the precursors of the ion-conductive polymers was laminated on the negative electrode. The laminated was irradiated from above with an ultraviolet ray of 365 nm wavelength at an intensity of 30 mW/cm² for three minutes. At this time, the weight ratio of the ion-conductive polymers to the fibrous organic compound was 90:10.

By irradiation with the ultraviolet ray for a specific period of time, an ion-conductive polymer was formed in a gel state to be integrated with the negative electrode and the fibrous organic compound. The thus obtained ion-conductive polymer layer was 20 μm thick.

c) With 100 parts by weight of powdered LiCoO₂ of 7 μm average particle diameter, were mixed 7 parts by weight of PVDF as a binder and 5 parts by weight of acetylene black as a conductor. NMP was admixed and dissolved to give a paste. The paste was coated onto a rolled aluminum foil of 20 μm thickness, dried and pressed to give a positive electrode. The area of this electrode was 9 cm² and its thickness was 80 μm.

An electrolyte was prepared in which 1.0 mol/L of LiBF₄ was dissolved in a mixed solvent of EC, PC, γBL and EMC (EC:PC:γBL:EMC=30:20:20:30 (volume %)). The electrolyte was mixed with the compounds K₅ and K₆ which were precursors of ion-conductive polymers in a weight ratio of 90:5:5. To the resulting mixture, DMPA 1000 ppm was added to prepare a polymerization liquid.

Next, the above-described positive electrode was allowed to stand under reduced pressure for five minutes. The above mixed solution was poured onto the positive electrode, cast and allowed to stand for another five minutes.

Thereafter, the positive electrode, with nothing put on, was irradiated with an ultraviolet ray of 365 nm wavelength at an intensity of 30 mW/cm² for three minutes. Thereby an ion-conductive polymer was formed in a gel state to be integrated with the positive electrode. The thus obtained ion-conductive polymer layer was 10 μm thick.

d) A battery of Example 8 was produced by bonding the (ion-conductive polymer+fibrous organic compound) layer/the negative electrode/the negative electrode collector obtained in b) to the positive electrode collector/the positive electrode/the ion-conductive polymer layer obtained in a). The total thickness of these positive electrode layer/electrolyte layer/negative electrode layer was 190 μm.

Example 9

A battery of Example 9 was produced in the same manner as in Example 8 except that the compound K₆ in Example 8 was replaced with the following compound K₇. The total thickness of the positive electrode layer/electrolyte layer/negative electrode layer was 190 μm.

The compound K₇ has an average molecular weight of 200 to 300 and is presented by the following formula:

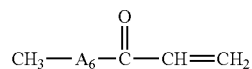

(wherein A₆ is a bivalent residue containing at least three EO and optionally PO, and the numbers of PO and EO satisfy PO/EO=0.25).

Example 10

A battery of Example 10 was produced in the same manner as in Example 8 except that the compound K₆ in Example 8 was replaced with the following compound K₈. The total thickness of the positive electrode layer/electrolyte layer/negative electrode layer was 190 μm.

The compound K₈ has an average molecular weight of 3500 to 4500 and is presented by the following formula:

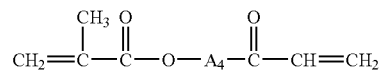

(wherein A₄ is a bivalent residue containing at least three EO and optionally PO, and the numbers of PO and EO satisfy PO/EO=0.25).

Example 11

A battery of Example 11 was produced in the same manner as in Example 8 except that the mixed solvent of EC, PC, GBL and EMC (EC:PC:GBL:EMC=30:20:20:30 (volume %)) in Example 8 was replaced with a mixed solvent of EC, PC and EMC (EC:PC:EMC=35:35:30 (volume %)). The total thickness of the positive electrode layer/electrolyte layer/negative electrode layer was 190 μm.

Comparative Example 7

A battery of Comparative Example 7 was produced in the same manner as in Example 8 except that the negative electrode active material in Example 8 was replaced with an artificial graphite having properties of (d002)=0.337 nm, (Lc)=100 nm and (La)=100 nm by X-ray wide-angle diffraction analysis and a specific surface area of 10 m$^2$/g by the BET method. The total thickness of the positive electrode layer/electrolyte layer/negative electrode layer was 190 μm.

The following table 4 summarizes the constitution of the batteries of Examples 2, 8 to 11 and Comparative Example 7.

TABLE 4

| | Composition of Organic Electrolyte | Composition of Ion-Conductive Polymer | Negative Electrode Material |
|---|---|---|---|
| Example 2 | 1 mol/1 LiPF6 EC:EMC = 35:65 by weight | Organic Electrolyte mentioned left:K4 = 10:90 by weight | Carbon material of graphite particles to whose surface amorphous carbon is attached (specific surface area 2 m$^2$/g) |
| Example 8 | 1 mol/1 LiPF4 EC:PC:GBL:EMC = 30:20:20:30 by weight | Organic Electrolyte mentioned left:Kd:Kf = 90:5:5 by weight | |
| Example 9 | Same as in Example 8 | Organic Electrolyte mentioned left:Kd:Kg = 90:5:5 by weight | |
| Example 10 | Same as in Example 8 | Organic Electrolyte mentioned left:Kd:Ke = 90:5:5 by weight | |
| Example 11 | 1 mol/1 LiPF4 EC:PC:EMC = 35:35:30 by weight | Same as in Example 8 | |
| Comparative Example 7 | Same as in Example 8 | Same as in Example 8 | Artificial Graphite Particles (specific surface area: 10 m$^2$/g) |

The batteries of Examples 2, 8 to 11 and Comparative Example 7 were charged at a constant current of 2.3 mA until they reached a battery voltage of 4.1 V. After they reached 4.1 V, the batteries were charged at the constant voltage for the total charge time of 12 hours. The batteries were discharged at a constant current of 2.3 mA and 10 mA until they reached a battery voltage of 2.75 V. FIG. 5 shows the discharge capacity and the charge/discharge efficiency at the first cycle when the discharge was conducted under the above conditions.

TABLE 5

| | Discharge Capacity | | |
|---|---|---|---|
| | 2.3 mA discharge | 10 mA discharge | Charge/Discharge Efficiency at First Cycle |
| Example 2 | 24.0 mAh | 21.9 mAh | 82% |
| Example 8 | 24.1 mAh | 22.4 mAh | 83% |
| Example 9 | 24.2 mAh | 22.4 mAh | 84% |
| Example 10 | 24.0 mAh | 22.0 mAh | 82% |
| Example 11 | 24.1 mAh | 22.3 mAh | 84% |
| Comparative Example 7 | 15.7 mAh | 5.2 mAh | 52% |

As understood from Table 5, as compared with the battery of Example 2, the batteries of Examples 8 to 11 exhibited equivalent or better discharge capacities at high load. Equivalent results are shown regarding the charge/discharge at the first cycle.

That is, it has been proved that a precursor of an ion-conductive polymer constituted of acrylate is more preferable than one constituted of methacrylate.

On the other hand, the discharge capacity and charge/discharge efficiency of the battery of Comparative Example 7 were by far lower than those of the batteries of the examples. That shows that, with use of the carbon material of the present invention in which amorphous carbon is attached to the surface of graphite particles, ion-conductive polymers containing PC are sufficiently usable in the present battery system.

More particularly, it has been found that the battery in which the carbon material of the present invention and the ion-conductive polymer are combined solves the problem as reported with conventional graphite type carbon materials that the presence only of 10% PC in the electrolyte induces the decomposition of PC remarkably and renders charge/discharge operation impossible.

By use of a polymer battery comprising a negative electrode comprising at least a carbon material as an active material, an electrolyte layer and a positive electrode comprising at least a lithium-containing chalcogenide as an active material, wherein the electrolyte layer contains an ion-conductive compound and a polymer fiber, and the carbon material comprises graphite particles having amorphous carbon attached to the surface thereof, it has become possible to suppress the decomposition of the ion-conductive compound caused by charge and discharge, and as a result, to eliminate the short circuit, expansion and leakage of the battery and improve the reliability of the battery.

Furthermore, by use of the material for positive electrodes of the present invention, it has become possible to reduce the amount of the EC component in the ion-conductive compound and produce a battery which can exhibit excellent charge/discharge characteristics at low temperatures.

Also, when the battery is produced, by including the precursor of the ion-conductive compound beforehand in the above-mentioned negative electrode and positive electrode and crosslinking the precursor with the precursor of the ion-conductive compound in the electrolyte layer, it is possible to reduce the number of interfaces between the electrodes and the electrolyte. Thus the internal resistance of the battery can be reduced, and the battery can be produced to be excellent in high load discharge characteristics and high-speed charge characteristics. Further, the electrode and electrolyte can be integrally formed and the productivity of the battery can be improved.

If the precursor of the ion-conductive compound of the present invention is a mono-functional, di-functional or tri-functional acrylate, the crosslinking reaction shows a high degree of reaction. Accordingly, the precursor does not remain unreacted within the electrode or at the interface, and consequently, side reaction on the electrodes can be suppressed and the battery can be produced to have good cycle characteristics and high reliability.

The invention claimed is:

1. A polymer battery comprising:
a negative electrode comprising, as an active material, a carbon material containing graphite particles having amorphous carbon attached to the surface thereof;
an electrolyte layer; and
a positive electrode comprising at least a lithium-containing chalcogenide as an active material,
wherein the electrolyte layer comprises a lithium salt, an organic electrolyte comprising 2 to 35 percent ethylene carbonate by weight, and a composite obtained by crosslinking a precursor of an ion-conductive compound contained in the positive electrode or the negative electrode together with a precursor of an ion-conductive compound contained in a polymer fiber forming the electrolyte layer, and
wherein the ion-conductive compound is a crosslinked substance obtained by crosslinking at least one precursor of an ion-conductive compound represented by the formula:

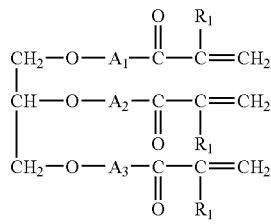

wherein $R_1$ is a hydrogen atom or methyl group, $A_1$, $A_2$ and $A_3$ are bivalent residues having at least three ethylene oxide units (EO) and optionally containing at least one propylene oxide unit (PO) wherein the numbers of PO and EO satisfy $0 \leq PO/EO \leq 5$, and the average molecular weight of the ion-conductive compound is 7500 to 9000.

2. A polymer battery as set forth in claim 1, wherein the negative electrode and the positive electrode contain the same ion-conductive compound as the electrolyte layer contains,
the ion-conductive compound in the negative electrode, the positive electrode and the electrolyte layer are formed by crosslinking corresponding precursors, and
the crosslinking of the precursor of the ion-conductive compound in the electrolyte layer is carried out together with the crosslinking of the precursor of the ion-conductive compound contained in the negative electrode or the positive electrode.

3. A polymer battery as set forth in claim 2, wherein the positive electrode, the negative electrode and the electrolyte layer form a single composite obtained from including the precursor of the ion-conductive compound in the polymer fiber of the electrolyte layer, the positive electrode and the negative electrode, and crosslinking the precursor by applying an ultraviolet ray onto the polymer fiber, the positive electrode and the negative electrode.

4. A polymer battery as set forth in claim 1, wherein the polymer fiber comprises at least one of polypropylene fiber, polyethylene fiber and polyester fiber.

5. A polymer battery as set forth in claim 1, wherein the weight ratio of the ion-conductive compound to the polymer fiber in the electrolyte layer is within a range from 91:1 to 50:50.

6. A polymer battery as set forth in claim 1, wherein the graphite particles having amorphous carbon attached to the surface thereof have an average interplanar distance ($d_{002}$) in plane (002) of 0.335 to 0.340 nm, a crystalline unit battery thickness (Lc) in a direction of plane (002) of 10 nm or more and a crystalline unit battery thickness (La) in a direction of plane (110) is 10 nm or more.

7. The polymer battery as set forth in claim 1, wherein at least one of the bivalent residues additionally comprises at least one propylene oxide unit.

8. A polymer battery as set forth in claim 1, wherein the electrolyte layer further comprises a lithium salt and the ion-conductive compound is a crosslinked substance obtained by crosslinking at least one precursor of an ion-conductive compound represented by the following formula:

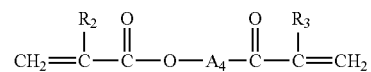

wherein $R_2$ and $R_3$ are independently a hydrogen atom or methyl group, and $A_4$ is a bivalent residue having at least three ethylene oxide units (EO), and optionally containing at least one propylene oxide unit (PO), wherein the numbers of PO and EO satisfy $0 \leq PO/EO \leq 5$.

9. The polymer battery as set forth in claim 8, wherein the bivalent residue additionally comprises at least one propylene oxide unit.

10. A polymer battery as set forth in claim 1, wherein the electrolyte layer further comprises a lithium salt and the ion-conductive compound is a crosslinked substance obtained by crosslinking at least one precursor of an ion-conductive compound represented by the following formula:

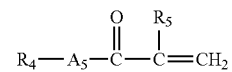

wherein $R_4$ and $R_5$ are independently a hydrogen atom or methyl group, and $A_5$ is a bivalent residue having at least three ethylene oxide units (EO), and optionally containing at least one propylene oxide unit (PO), wherein the numbers of PO and EO satisfy $0 \leq PO/EO \leq 5$.

11. The polymer battery as set forth in claim 10, wherein at least one of the bivalent residues additionally comprises at least one propylene oxide unit.

12. A polymer battery as set forth in claim 1, wherein the ion-conductive compound is a crosslinked substance obtained by crosslinking at least one precursor of an ion-conductive compound represented by the following formula:

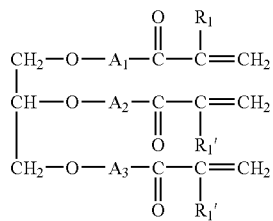

wherein $R_1'$ is a hydrogen atom or a lower alkyl group having a carbon number of 1 or more, $A_1$, $A_2$ and $A_3$ are bivalent residues having at least three ethylene oxide units (EO) and optionally containing at least one propylene oxide unit (PO), wherein the numbers of PO and EO satisfy $0 \leq PO/EO \leq 5$ and $EO+PO \geq 10$, and the average molecular weight of the ion-conductive compound is 7500 to 9000.

13. A polymer battery as set forth in claims 1, 8 or 10, wherein the electrolyte layer comprises an organic electrolyte in which at least one lithium salt selected from $LiBF_4$, $LiPF_6$ and $LiN(CF_3SO_2)_2$ is dissolved in a mixed organic solvent composed of ethylene carbonate and at least one solvent selected from propylene carbonate, γ-butyrolactone, ethylmethyl carbonate, dimethyl carbonate and diethyl carbonate.

14. A polymer battery as set forth in claim 13, wherein the weight ratio of the ion-conductive compound to the organic electrolyte is within a range from 30:70 to 2:98.

15. A polymer battery as set forth in claim 13, wherein the content of the lithium salt is at least 3 to 35 wt %.

16. The polymer battery as set forth in claim 12, wherein at least one of the bivalent residues additionally comprises at least one propylene oxide unit.

17. A polymer battery as set forth in claim 1, wherein the electrolyte layer further comprises a lithium salt and the ion-conductive compound is a crosslinked substance obtained by crosslinking at least one precursor of an ion-conductive compound represented by the following formula:

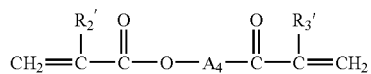

wherein $R_2'$ and $R_3'$ are independently a hydrogen atom or a lower alkyl group having a carbon number of 1 or more, and $A_4$ is a bivalent residue having at least three ethylene oxide units (EO) and optionally containing at least one propylene oxide unit (PO) wherein the numbers of PO and EO satisfy $0 \leq PO/EO \leq 5$ and $EO+PO \geq 10$.

18. The polymer battery as set forth in claim 17, wherein the bivalent residue additionally comprises at least one propylene oxide unit.

19. A polymer battery as set forth in claim 1, wherein the electrolyte layer further comprises a lithium salt and the ion-conductive compound is a crosslinked substance obtained by crosslinking at least one precursor of an ion-conductive compound represented by the following formula:

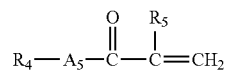

wherein $R_4'$ and $_R5'$ are independently a hydrogen atom or a lower alkyl group having a carbon number of 1 or more, $A_5$ is a bivalent residue having at least three ethylene oxide units (EO), and optionally containing at least one propylene oxide unit (PO), wherein the numbers of PO and EO satisfy $0 \leq PO/EO \leq 5$ and $EO+PO \geq 3$.

20. The polymer battery as set forth in claim 19, wherein the bivalent residue additionally comprises at least one propylene oxide unit.

21. A polymer battery as set forth in claim 1, wherein the graphite particles having amorphous carbon attached to the surface thereof have an average interplanar distance ($d_{002}$) in plane (002) of 0.335 to 0.340 nm, a crystalline unit battery thickness (Lc) in a direction of plane (002) of 40 nm or more, and a crystalline unit battery thickness (La) in a direction of plane (110) is 10 nm or more.

22. A polymer battery as set forth in claim 4, wherein the polymer fiber is a nonwoven textile having a gas permeability of 1 to 500 sec/cm$^3$.

* * * * *